(No Model.)
J. C. RUBY & M. E. FREY.
COMPRESSOR PUMP.
No. 512,664.   Patented Jan. 9, 1894.
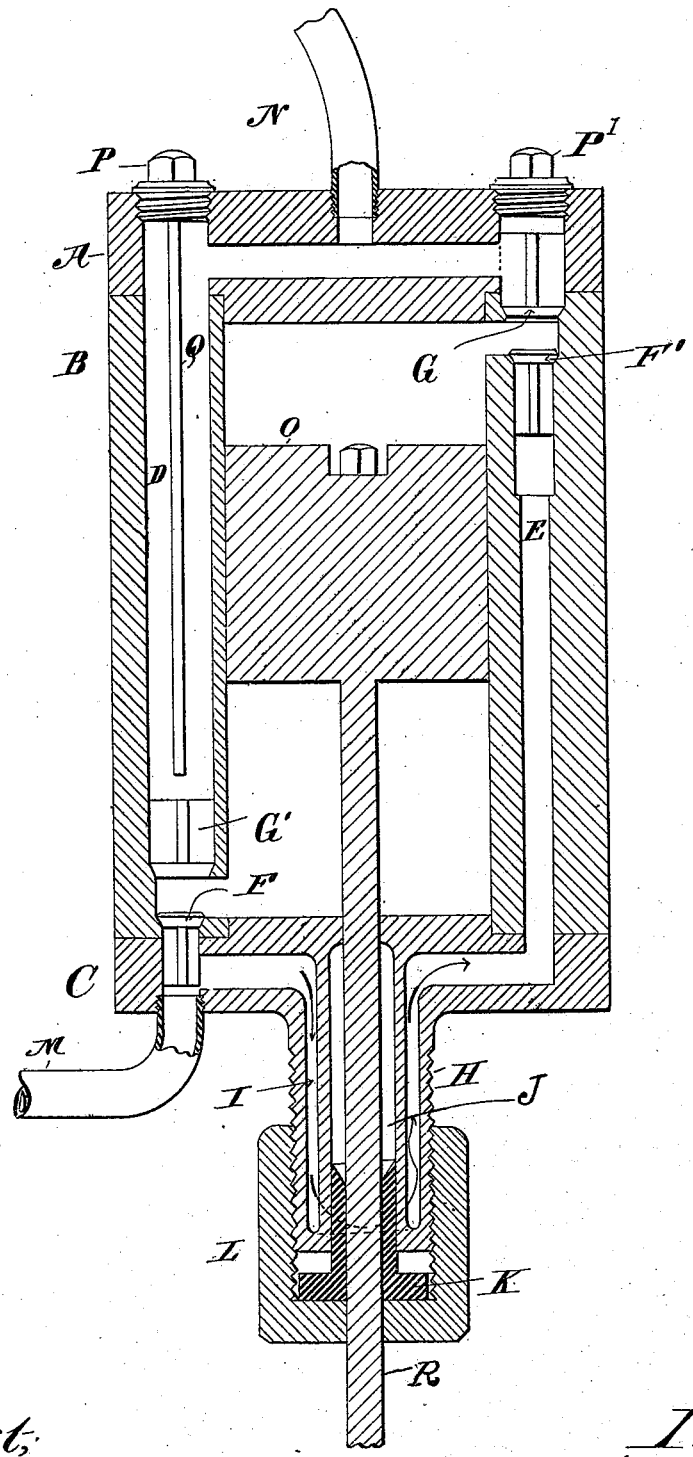
Attest,
C. W. Benjamin
E. W. Grigg.
Inventors
John C. Ruby
and Milton E. Frey
by Read & Price
their Attys

UNITED STATES PATENT OFFICE.

JOHN C. RUBY AND MILTON E. FREY, OF YORK, PENNSYLVANIA, ASSIGNORS TO THE NATIONAL MANUFACTURING ICE AND REFRIGERATING MACHINE COMPANY, OF BALTIMORE CITY.

COMPRESSOR-PUMP.

SPECIFICATION forming part of Letters Patent No. 512,664, dated January 9, 1894.

Application filed September 21, 1892. Serial No. 446,389. (No model.)

*To all whom it may concern:*

Be it known that we, JOHN C. RUBY and MILTON E. FREY, citizens of the United States, residing at York, in the county of York and State of Pennsylvania, have invented certain new and useful Improvements in Compressor-Pumps; and we do hereby declare the following to be a full, clear, and exact description of the invention, such as will enable others skilled in the art to which it appertains to make and use the same.

The object of this invention is to keep the piston of a gas compression pump cool, and to permit easy access to the valves for cleaning or repairs.

The invention is especially applicable to such gases as are commonly used for refrigerating purposes, as ammoniacal gas, which may be condensed into a liquid, although certain features are applicable to the employment of any gas.

The first feature is carried out by leading the gas into a compression chamber through ports which surround the stuffing box, thus lowering the temperature of the latter and keeping the piston cool by the absorption of heat by the expanding gas.

The second object is carried out by providing openings in the cylinder through which the valves may be withdrawn, the openings being normally closed by detachable screw caps or plugs.

The several features of novelty will be more particularly hereinafter described in this specification and definitely indicated in the appended claim.

In the accompanying drawing which illustrates the invention is shown a central longitudinal section of a pump embodying my improvements.

The body of the pump is formed of three sections, A, B, and C. The central portion B is provided with a central opening forming the piston chamber and ducts D and E outside of said chamber. The walls of these ducts form seats for induction and eduction valves F, G, F', G'. In the head A is formed a duct communicating with the duct D and through a valve with the cylinder, and in the head C which is provided with a tubular extension to form a stuffing box for the piston-rod R is formed a duct leading around the stuffing box and opening into the compression chamber through a suitable valve at one point and being in open communication with the duct E at another point. The extension H forming the stuffing box is made hollow, as indicated at I, the hollow portion surrounding the stuffing box and being connected at one side with one of the induction ports of the compression cylinder, and on the other side with the pipe M for the return gas from a system of refrigerating coils or pipes. This gas is either the return gas from refrigerating coils, or other cooling gas to be compressed. A central recess J is formed in the extension H of the pump head to form a stuffing box, easy access to the latter being permitted by means of the plug K and screw cap L surrounding the piston rod.

Induction and eduction pipes M and N connect at the supply and delivery ends of the pump. The pipe N is connected with a cooling or condensing reservoir for the compressed gas and the pipe M is preferably connected with the cooling pipes in which the gas is allowed to expand and act as a refrigerant.

In the walls of the central portion B of the pump are formed seats for the valves F, G, F', G', the valves F, F' being of a size which will permit their removal through the seats of the valves G, G'.

In the end A of the cylinder are screw caps P, P', the former being provided with a stem Q to limit the play of the valve G'.

The operation of the pump is as follows: On the up stroke of the piston O valves F, G, are opened and F', G' closed. On the down stroke of the piston the valves F', G' are opened and the valves F, G closed. It will thus be seen that the pump is double acting. The reciprocation of the piston causes an induction of cool gas through the pipe M and an expulsion of compressed gas through the pipe N. The cool gas in entering passes through the port I surrounding the stuffing box. The compression of the gas develops considerable heat which is communicated to the piston and piston rod, but by permitting the entering gas to expand into the cylinder through the port I the piston rod is kept cool and overheating of the apparatus prevented.

Having thus described our invention, what we claim as new, and desire to secure by Letters Patent, is—

In a double acting compressor pump, the combination with the piston of the same, of induction and eduction valves, ports leading from main induction and eduction pipes to the said valves respectively, a stuffing box surrounding the piston rod, and a chamber surrounding the stuffing box, and in the path of the port leading to the induction valves, whereby the stuffing box is cooled by the passage of the entering gas, substantially as described.

In testimony whereof we affix our signatures in presence of two witnesses.

JOHN C. RUBY.
MILTON E. FREY.

Witnesses:
D. F. STAUFFER,
D. F. YOST.